United States Patent [19]

Hasuike et al.

[11] Patent Number: 4,504,868
[45] Date of Patent: Mar. 12, 1985

[54] CONTROL SYSTEM FOR A LINE SCANNING TYPE OUTPUT UNIT

[75] Inventors: Kazuo Hasuike, Tokyo; Kazunori Konishi, Kawasaki; Akira Kurematsu, Yokohama, all of Japan

[73] Assignee: Kokusai Denshindenwa Co., Ltd., Tokyo, Japan

[21] Appl. No.: 345,634

[22] Filed: Feb. 4, 1982

[30] Foreign Application Priority Data

Feb. 5, 1981 [JP] Japan ................................. 56-14995

[51] Int. Cl.³ .............................................. H04N 1/40
[52] U.S. Cl. ..................................... 358/280; 358/256
[58] Field of Search .............. 358/256, 257, 258, 264, 358/285, 287, 288, 280; 340/721, 745, 749, 814; 354/6

[56] References Cited

U.S. PATENT DOCUMENTS 3,828,319  8/1974  Owen et al. ......................... 358/261
4,208,677  6/1980  Schayes et al. ..................... 358/280
4,320,419  3/1982  Cottriall ............................. 358/258

Primary Examiner—Joseph A. Orsino, Jr.

[57] ABSTRACT

A control system for a line scanning type output unit which is made capable of generating both facsimile and text by setting the scanning density in the sub scanning direction at a higher value, but within the allowable error range, to match both the scanning density of the facsimile and the pitch of the text, by providing two types of clocks for composing image signals, i.e. a fax clock which matches with the resolution in the main direction of the facsimile and a text clock which matches with the pitch of the main scanning direction of the text, so that the fax clock may be employed to compose an image signal which is fed to the output unit for facsimile output and the text clock may be employed to compose image signal which is fed to the output unit for text output.

7 Claims, 6 Drawing Figures

CONTROL SYSTEM FOR A LINE SCANNING TYPE OUTPUT UNIT

BACKGROUND OF THE INVENTION

The present invention relates to a control system which enables a line scanning type output unit to generate both the facsimile and the text.

DESCRIPTION OF THE PRIOR ART

Recent development in facsimile communications and data communication urges the need to process the facsimile and the text on a common basis. As a part of the tendency, one output unit is required to be capable of producing both the facsimile and the text at a terminal. The resolution of the facsimile is, however, based on the unit of milimeters which was determined by the CCITT (International Telegraph and Telephone Consultative Committee), while the pitch of the text is traditionally based on the unit of inches. Mere use of a single output unit for both purposes would therefore not essentially permit the alignment of these outputs. In other words, use of one output unit in common for both purposes was not possible. CCITT provides that the line density of facsimile in the main scanning direction be 8.04 pel (Picture Element)/mm and 3.85 lines/mm or 7.7 lines/mm in the sub scanning direction. The pitches of the text, on the other hand, has traditionally been multiples of 1/60 in. by the integer in the main scanning direction and 1/3, 1/4 or 1/6 in. in the sub scanning direction. Due to the difference in the specifications of the scanning, an output unit which matches with the facsimile is essentially incompatible with the text, or vice versa.

SUMMARY OF THE INVENTION

The present invention aims to provide a control system which enables a line scanning type output unit to produce both facsimile and text by controlling the mismatching between the facsimile and the text within an error range which would cause no problems in practical use.

According to the present invention, the scanning density in the sub scanning direction of a line scanning type output unit is set at a value which coincides with the scanning density of the facsimile when divided by a first integer and which, when divided by a second integer falls under the error range allowable in practical use of the pitch of the text in the subscanning direction. A fax clock according to the present invention has a frequency which in proportionate to the resolution of the facsimile in the main scanning direction and, at the same time, synchronous with the line synchronizing signal of the output unit. A text clock has a frequency which is proportionate to the pitch of the text in the main scanning direction and, at the same time, synchronous with the line synchronizing signal of the output unit. These two clocks are used for composing image signals, and are selectively employed depending on whether information to be fed is a facsimile or a text in order to control the output unit in the main scanning direction. In the case of a facsimile output, the fax clock is employed to compose a fax image signal, which is transmitted to the output unit, while in the case of a text output, the text clock is employed to compose a text image signal, which in turn is transmitted to the output unit. For the control of the output unit in the sub scanning direction for a facsimile output, there are provided facsimile lines in a number corresponding with the said first integer. On the other hand, in case of a text output control, there are allocated text lines in a number of corresponding with the said second integer.

DETAILED DESCRIPTION OF THE INVENTION

The present invention will now be described in terms of the facsimile.

(1) Matching in the sub scanning direction

Mechanical line density of the line scanning type output unit in the sub scanning direction is adopted to be a multiple by integer of maximum line density of the facsimile (e.g. 15.4 lines/mm). A suitable number of the scanning lines having such line density is alloted to the pitch of the text in the sub scanning direction for changing the lines.

Suppose the line density in the sub scanning direction is given as 15.4 lines/mm, the specification for the facsimile will completely be satisfied, as shown in the column for errors in Table 1, if the value n in said Table is allotted for changing the line. The specification for the text will also be satisfied within the error range of ±0.3%.

TABLE 1

| Type | Line Density | Pitch | n | Error (%) |
|---|---|---|---|---|
| Facsimile | 7.7/mm | — | 2 | 0 |
|  | 3.85/mm | — | 4 | 0 |
| Text | — | 1/6 in. | 65 | −0.295 |
|  | — | ¼ | 98 | +0.217 |
|  | — | ⅓ | 130 | −0.295 |

(2) Matching in the main scanning direction

A pulse row whose time width corresponds both with the picture element density of the facsimile in the main scanning direction (8.04 per/mm) and the pitch of the text in the main scanning direction (1/60 in. multiplied by an integer) will be given. In other words, two kinds of clocks which are compatible with the facsimile and the text respectively will be provided, and by selectively employing either one of the two clocks, the matching in the main scanning direction will be perfectly achieved. Given the scanning rate of the line scanning type output unit in the main scanning direction as v mm/sec., the two kinds of clocks are:

(1) a clock which is $(8.04 \times v)$ Hz as against the facsimile, and (2) a clock which is $(60 \times K \times v/25.4)$ Hz when the dot density of one character in the lateral direction is given as $60 \times K$ dots/inch as against the text.

The present invention will now be described in more detail with reference to the embodiment and the attached drawings.

Figure 1:
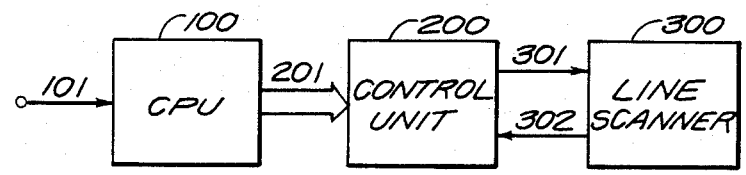
FIG. 1 is a block diagram illustrating an embodiment of a line scanning type output unit according to the present invention.

FIG. 1 shows an embodiment of a line scanning type output unit according to the present invention. In the figure, the reference number 100 denotes a central processing unit (a computer, referred to as CPU hereunder), 200 a control system according to the present invention, and 300 a scanning unit.

CPU 100 separates the facsimile signal from the text signal in the information 101 which is introduced from a communication circuit and other input means and stores them. As for the facsimile, CPU 100 further analyzes the added facsimile information such as the position of a printed character and the size of facsimile part, etc. As for the text signal, CPU analyzes the text information such as the pitch in the sub scanning direction, and converts them into signals 201 to be transmitted to the control unit 200. The scanner 300 is a line scanning type, and the line density in the sub scanning direction in this embodiment is set at 15.4 lines/mm. The resolution in the main scanning direction is determined by the frequency of the input signal 301. The control unit 200 is a unit provided to realize the present invention. The control unit 200 controls the facsimile signals and the text signals from the CPU 100 with the use of the facsimile information and the text information, also from the CPU 100, and the line synchronizing signal 302 which indicates the start of each line scanning and which is produced by the scanner 300, thereby transmitting an image signal 301 to the scanner 300.

Figure 2:
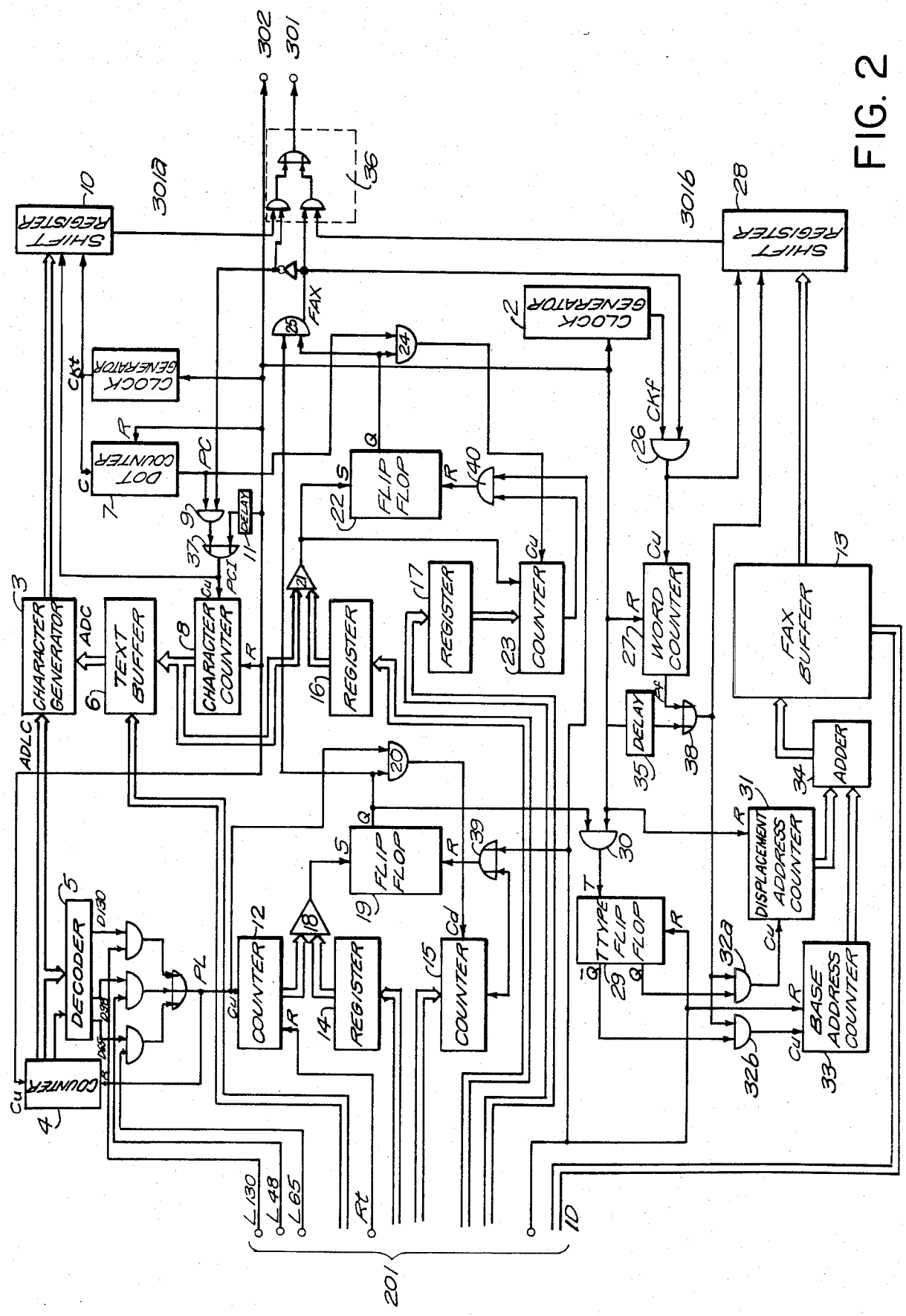
FIG. 2 is a circuit diagram showing one embodiment of the control unit shown in FIG. 1.

FIG. 2 illustrates an embodiment of the control unit 200 according to the present invention. In the figure, the reference number 1 denotes a text clock generator, 2 a fax clock generator, respectively generating clocks ckt and ckf of the frequencies relative to the scanning rate v mentioned above travelling in synchronization with the line synchronizing signals 302 from the scanner 300. As the clocks synchronize with the line synchronizing signals 302, the positions of the dots will coincide in the scanning lines to produce a charactor or a graph in perfect alignment without displacement. Conventional techniques such as demultiplying harmonics and the like may be used for synchronizing the clocks.

Figure 3:
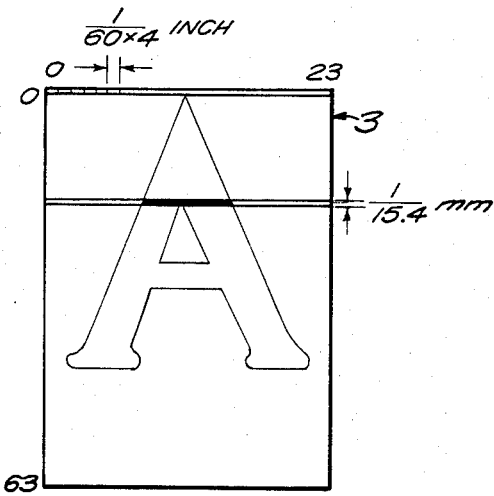
FIG. 3 shows an explanatory diagram of an embodiment of a character generator.

The control of the text output will first be described. The reference number 3 denotes a character generator which is an exclusive read-out memory for storing the shapes of characters in the form of dot matrix. For the sake of simplicity, the memory here supposedly stores 128 kinds of characters of 1/10 inches in width, as shown in FIG. 3, and the dot matrix is given as 24(width)×64(length). The interval between the dots in lateral direction is therefore 1/240×1/60×4 inches, and the text clock ckt is given as 240×v/25.4 Hz. The kind of characters will be designated by 7 bit character address ADC. The output of dot matrix for characters is generated by the 7 bit character line address ADLC. When the 7th bit of the character line address is "0", a 24 bit dot information will be produced in parallel for every line in the dot matrix designated by the remaining 6 bits. When said 7th bit is "1", a 24 bit information which indicates a white line (null) will be produced. The reference number 4 denotes a character line counter which receives the line synchronizing signal 302 from the scanner 300 to transmit a character line address ADLC. The line address of character designates the scanning lines (65 line, 98 lines or 130 lines) in one line of characters (1/6 in., 1/4 in., or 1/3 in.) for every line. The line counter for character 4 therefore needs to count the number of the facsimile lines in one text line successively. In order to do this, a decoder 5 is used to decode the line address of character to produce 3 kinds of decoded signals, i.e. D65, D98, and D130 to indicate counts of 65, 98 and 130 respectively. These decoded signals will be selected by 3 kinds of line-interval designating signal lines L65, L98 and L130 so that the line counter for character 4 can be reset.

The reference number 6 denotes a text buffer which is a read-write memory for receiving a row of characters corresponding to one line in the form of a character code. The character code is used as the character address ADC for the character generator 3. The reference numeral 7 denotes a dot counter for a character which produces character pulse PC in the time interval corresponding to one character of 1/10 in. in width by demultiplying the text clock ckt to 1/24 to count 24 dots. The dot counter for character 7 is adapted to be reset by the line synchronizing signal 302 from the scanner, so that the phase of the character pulse PC between the lines will be maintained constant.

The reference number 8 denotes a character counter which is counter up by a signal PCs, or the logical sum at the gate 37 comprising the character puls PC transmitted from the gate 9 which is activated only at the time of text output, or when the facsimile is not transmitted, and the line synchronizing signal via the delay circuit 11, to count the number of characters in one line. The delay corresponds to the time necessary for the corresponding dot information to be transmitted from the character generator 3 after the character counter 8 is reset. It should be sufficiently less than the period of the text clock ckt. By feeding the output of the character counter 8 as a read-out address of the text buffer 6, the code of the character which is supposed to be at this address will be generated as a character address ADC for the character generator 3 from the text buffer 6. Among the characters designated by the character address, the dot information of the character line designated by the line address of character ADLC from the line counter for character 4 will be generated in 24 bit in a parallel manner.

The reference numeral 10 denotes a shift register which converts the parallel 24 bit signals from the character generator 3 into serial signals to generate a text image signal 301a. The parallel signals will be loaded to the shift register 10 by means of the signal PCz from the gate 37 in the same manner as the counting up of the character counter 8. By this method, the dot information of the character which corresponds with the address "0" of the text buffer 6 will be supplied to the shift register 10 immediately after the line synchronizing signal 302, and the address of the text buffer 6 will be added by "1". This repeats each time the scanning of one character width is completed. Since the shift clock for the shift register 10 has been provided with text clock ckt, the output 301a of the shift register 10 will become a text image signal which is a character scanned in lateral direction for every line.

The reference number 12 denotes a text line counter which is counted up by means of a signal PL which resets the line counter for character 4 to count the number of text lines. The line counter for text 12 is reset by the reset signal Rt from the CPU 100 before each page is printed out.

The above going relates to the explanation of the control of the text output. The control of facsimile output will now be explained.

Figure 4:
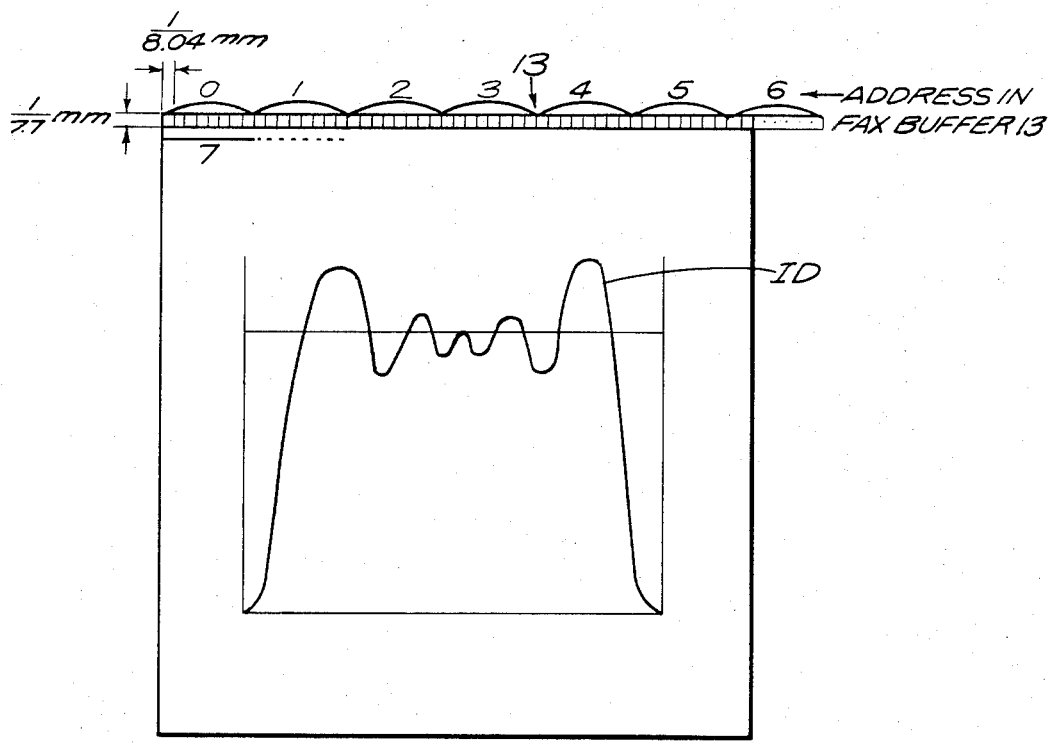
FIG. 4 is an explanatory diagram to show an embodiment of a fax buffer.

The reference numeral 13 denotes a fax buffer which is a read-write memory for storing a dot image ID transmitted over the CPU 100 as the image of a graph. For the sake of simplicity, this embodiment of the text buffer 13 is a memory of 8 bit/word parallel type which stores the dot image ID of a graph in the manner as shown in FIG. 4.

Figure 5:
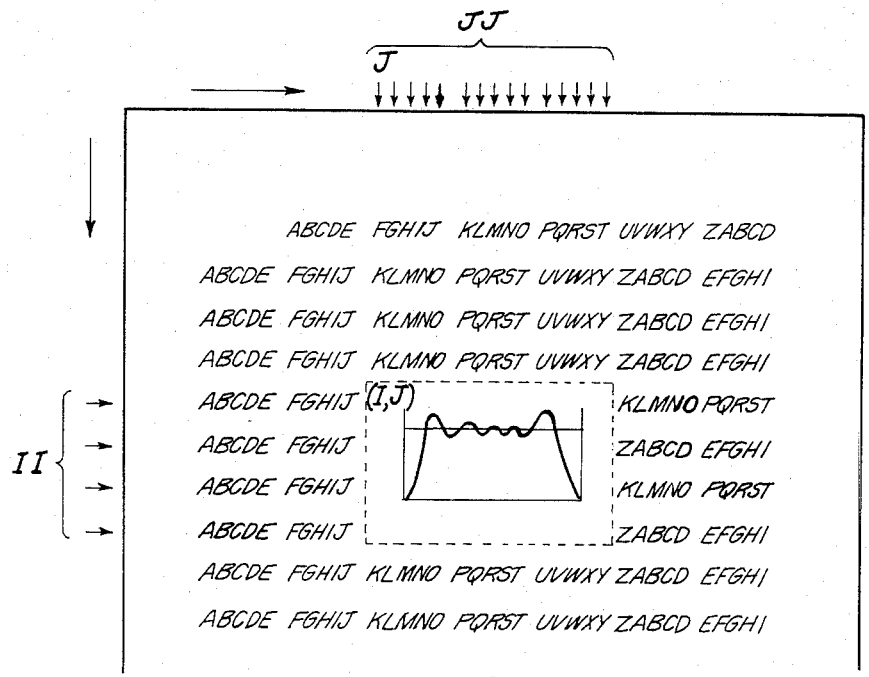
FIG. 5 is a diagram to explain the graphic insertion into the text.

The reference number 14 denotes a register for start line of fax region, 16 a register for start row of fax region which retains the values I and J for designating the points (I, J) in FIG. 5 in order to express, in the coordinate of pitches, the point at the upper left which corresponds to the start position of a graph corresponding to the dot image stored in the fax buffer 13. The reference number 5 is a line counter for fax region, 17 a row register for fax region, which respectively retain the values II and JJ for designating the length and width of FIG. 5 to express the size of a graph in terms of text pitch unit. Each register 14, 16, 17, the counter 15, and the fax buffer 13 constitute one unit, and an information which corresponds to one graph will be provided from the CPU 100.

The reference number 19 denotes a line flip-flop for fax region, 22 a row flip-flop for fax region; the line flip-flop for fax region 19 will be set only while a print proceeds the line in which a graph is inserted. The row flip-flop for fax region 22 will be set only while the print proceeds the row in which a graph is inserted. The logical multiply of the outputs from both the flip-flops 19 and 22 will be taken up at the gate 25, to produce a signal which becomes true only when the graph is being generated, or in other words, a graph output signal FAX is produced. Referring to FIG. 5, as the printing of the text proceeds so that the count of the line counter for text 12 reaches the start line for the graph, or the line 1, the contents of the text line counter 12 and the register for start line of fax region become coincided, whereby the output from the comparator 18 will set the line flip-flop for the fax region 19. Once set, the output for setting would activate the AND gate 20, and the puls PL which counts up the line counter for text 12 will count down the line counter for fax region 15. When the line proceeds only for a length of II lines which is the vertical length of the graph, the zero count output of the line counter for fax region 15 will reset the line flip-flop for fax region 19 via the OR gate 39. The line flip-flop for fax region 19 may also be reset by the resetting signal Rf from the CPU 100. In the scanning line for the lines in which the graph is inserted, the printing of the text has proceeded in the meantime so that the count of counter for character 8 reaches the row position where the graph starts, or at the row J, the character counter 8 and the register for start row of fax region 16 will coincide in their contents. The output of the comparator 21 will set the row flip-flop for fax region 22 and at the same time render the content of the row register for fax region 17 to be loaded on the row counter for fax region 23. Once the row flip-flop for fax region 22 is set, the output Q will activate the AND gate 24 to thereby start counting down the row counter for fax region 23 by means of the character pulse PC which counts up the character counter 8. When the row proceeds for the length of JJ rows which is the width of the graph, the zero count output of the row counter for fax region 23 will reset the row flip-flop for fax region 22 via the OR gate 40. The row flip-flop for fax region 22 will also be reset by means of the reset signal Rf from the CPU 100.

The reference number 27 denotes a word counter for facsimile which is a octal counter for counting up and generating the fax clock ckf from the fax clock generator 2 when the gate 26 is opened by the graph output signal FAX as it becomes true. This is so because it requires the fax puls Pf which is a fax clock demultiplied by 8 in order to read out the dot image (since the fax buffer 13 for storing the dot image ID is constructed by a memory of 8 bit/word). The logic sum of the fax pulse Pf and the line synchronizing signal over the delay circuit 35 is taken up by the gate 38 to generate a signal Pfz. This delay, as will be described hereunder, is the time necessary for a corresponding dot information to be generated from the fax buffer 13 after the displacement address counter for fax buffer 31 is reset.

Figure 6:
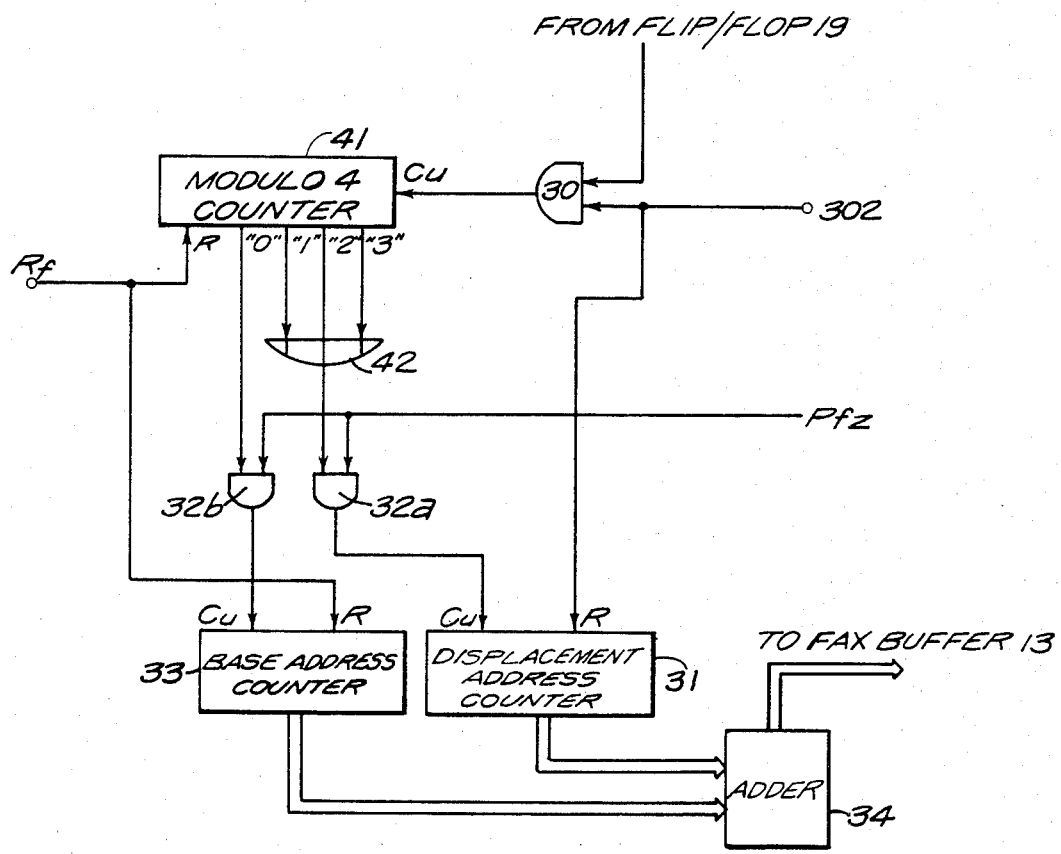
FIG. 6 is a circuit diagram to indicate another circuit for changing the line.

The reference number 29 denotes a T type flip-flop which for the purpose of dividing the scanning lines present in the region where the graph is inserted into even-numbered lines (0, 2, 4, ... 2n) and odd-numbered lines (1, 3, 5 ... 2n+1), demultiplies the line synchronizing signal 302 into 178 , the said signal 302 being obtained by the gate 30 which is activated by the Q output from the line flip-flop for fax region 19. The reference numeral 31 denotes a drift address counter for fax buffer and 33 a base address counter for fax buffer. The output of the T type flip-flop 29 alternatively activates the two gates 32a and 32b, and a signal Pfz over these two gates will render the displacement address counter for fax buffer 31 to count up every even-numbered scanning lines (0, 2, 4 ... 2n line) and the base address counter for fax buffer 33 to count up every odd-numbered scanning lines (1, 3, 5 ... 2n+1 line). The base address counter for fax buffer 33 is reset by the reset signal Rf for the time when the graph information is given from the CPU 100, as the line flip-flop for fax region 19, row flip-flop for fax region 22, and the T type flip-flop 29. The displacement address counter for fax buffer 31 is, like the word counter for facsimile 27, reset by the line synchronizing signal 302. The sum of the contents of both the base address counter for fax buffer 33 and the displacement address counter 31 for fax buffer is obtained by the adder 34 and the sum is given as the address for the fax buffer 13, whereby two lines will produce the same information, realizing the pitch i.e. 7.7 pel/mm in the sub scanning direction of the facsimile. In order to obtain the pitch of 3.85 pel/mm, a modulo 4 counter 41 and an "OR" gate 42 may be used in place of the T type flip-flop 29, as shown in FIG. 6.

The reference number 28 denotes a shift register which generates a fax image signal 301b by converting the 8 bit parallel output from the fax buffer 13 into a serial signal. The 8 bit parallel signal is loaded to the shift register 28 by means of the signal Pfz from the gate 38, whereby a corresponding dot information will be loaded to the shift register 28 immediately following the line synchronizing signal 302. The displacement address counter for fax region 31 will at the same time be added with "1". Subsequently, a corresponding dot information will be loaded on the shift register 28 while either the displacement address counter for fax region 31 or the base address counter for fax region 33 will concurrently be added with "1" whenever the output region of the facsimile is scanned. As the shift clock for the shift register 28, a fax clock ckf is given via the gate 26 only when the graph output signal FAX is true. The output

301b of the shift register 28 becomes a fax image signal which is the graph scanned in the corresponding row of dots in lateral direction.

The reference number 36 denotes a selecting gate which generates the fax image signal 301b as an image signal 301 when the graph output signal FAX is true. When the graph output signal FAX is false, on the other hand, the text image signal 301a is generated as the image signal 301. In other words, the text will be generated in pitches based on inches and the facsimile will be generated in pitches based on milimeters in the lines where the graph is inserted. When the graph output signal FAX is true, the gate 9 is not activated so that the counter for character 8 will not be counted up and there will be no change in the address of the text buffer 6. This simplifies the procedure of memory since the text buffer 6 may store the character code, even when the graph is inserted, as if the graph does not exist.

What we claim is:

1. A control system for a line scanning type output unit, with a main scanning direction and a sub scanning direction, said control unit enabling the output unit to do facsimile printing with a required line density and text printing at a required pitch comprising:
   means for setting resolution in the main scanning direction of said output unit so as to correspond to the sampling frequency of an input image signal to said output unit while line density in the sub direction of said output unit is constant;
   means for pre-setting said constant line density of said output unit at a value such that said value divided by a first integer falls within an error range of ±0.3% of the required line density of the facsimile, and said value divided by a second integer falls within an error range of ±0.3% of the required pitch of the text in the sub scanning direction;
   means for outputting a line synchronizing signal from said output unit at its every main scanning;
   a fax clock having a time period reversely proportionate to the required line density of the facsimile in the main scanning direction and synchronizing with said line synchronizing signal from the output unit; and a text clock having a time period reversely proportionate to the required pitch of the text in the main scanning direction and synchronizing with said line synchronizing signal from the output unit;
   means for selecting facsimile printing instead of text printing at both an address in the main scanning direction and an address in the sub scanning direction of said output unit respectively determined by data from a central processing unit;
   means for composing said image signal and transmitting same to said output unit, depending on whether information to be printed is a facsimile or a text when said output unit is to be controlled in the main scanning direction, so that when the facsimile is to be printed said fax clock is effective while said text clock is effective when the text is to be printed; and
   means for allotting scanning lines in a number corresponding to said first integer for the lines of the facsimile and for allotting scanning lines in a number corresponding to said second integer for the lines of the text when said output unit is to be controlled in its sub scanning direction.

2. The control system for a line scanning type output unit as claimed in claim 1, wherein the line density of the output unit in the sub scanning direction is 15.4 lines/mm.

3. The control system for a line scanning type output unit as claimed in claim 1, wherein the frequency of the fax clock is $8.04 \times V$ Hz and that of the text clock is $(60 \times K \times V / 25.4)$ when the scanning rate in the main scanning direction of the output unit is $V$ mm/sec. and the dot density of a character generated laterally is $60 \times K$ dot/inch.

4. The control system for a line scanning type output unit as claimed in claim 1, comprising switching means for switching from facsimile printing to text printing, or vice versa, on the basis of pitch of the text, said switching means comprising:
   a register which registers the data of a start line in a fax region determined by the data from the central processing unit;
   a text line counter which counts number of text line which has been output to said output unit;
   a comparator which compares said counted number of text line with said registered start line data;
   a register which registers the data of a start row of a fax region determined by the data from said central processing unit;
   a comparator which compares number of character which has been output to said output unit in the main scanning direction with said registered start row data; and
   a gate means which decides that the facsimile is selected instead of the text just after said counted number of line coincides with said registered start line data and said number of character coincides with said registered start row data.

5. The control system for a line scanning type output unit as claimed in claim 1, comprising means for repeatedly transmitting the same facsimile image signal to each scanning line in a number corresponding to the first integer, in order to achieve a matching between the line density in the sub scanning direction of the output unit and the required line density of the facsimile.

6. The control system for a line scanning type output unit as claimed in claim 5, wherein said means for repeatedly transmitting the facsimile image signal comprises:
   a fax buffer which stores the facsimile signal transmitted into the control system as a dot image;
   a word counter for facsimile which demultiplies the fax clock by a number corresponding to the number of bits per one word, and is a read out unit of the fax buffer;
   a base address counter which reads out the data required for one main scanning from said fax buffer by being counted up by the output from said word counter;
   a drift address counter which reads out the data from said fax buffer by the same adressing as said base address counter for a number of times corresponding to the first integer—1 after the end of addressing by said base address counter; and
   a shift register which stores said data read out from said buffer and generates the input image signal to the output unit by shifting said stored data bit by bit by means of the fax clock.

7. The control system for a line scanning type output unit as claimed in claim 6, wherein said means for composing the dot image signal of the text to be input to said output unit comprises:

a character generator which stores in advance various characters and signs in the form of a dot image, a text buffer which stores the text transmitted into the control system as a character address for a character generator, a dot counter for characters which demultiplies the text clock by a number corresponding to the number of bits per word of the character generator, a character counter which reads out consecutively the character address required for one main scanning from the text buffer to said character generator by being counted up by the output of said dot counter, an address means which repeatedly designates a line address of the character for reading out the dot image of the character addressed by said text buffer, and a shift register which stores said data read out from said character generator by said address means and generates the input image signal to said output unit by shifting said stored data bit by bit by means of said text clock.

* * * * *